(12) United States Patent
Lang et al.

(10) Patent No.: US 12,449,110 B2
(45) Date of Patent: Oct. 21, 2025

(54) LIGHTING SYSTEM FOR DYNAMIC LIGHTING CONTROL

(71) Applicant: LEDVANCE GmbH, Garching bei Munchen (DE)

(72) Inventors: Dieter Lang, Bruckmühl (DE); Enzo Peres, Munich (DE); Timo Weinert, Mühldorf am Inn (DE)

(73) Assignee: LEDVANCE GMBH, Garching bei Munchen (DE)

( * ) Notice: Subject to any disclaimer, the term of this patent is extended or adjusted under 35 U.S.C. 154(b) by 717 days.

(21) Appl. No.: 17/731,885

(22) Filed: Apr. 28, 2022

(65) Prior Publication Data

US 2022/0256666 A1    Aug. 11, 2022

Related U.S. Application Data

(63) Continuation of application No. 16/980,977, filed as application No. PCT/EP2019/056576 on Mar. 15, 2019, now Pat. No. 11,324,088.

(30) Foreign Application Priority Data

Mar. 15, 2018   (DE) .......................... 1020181060890

(51) Int. Cl.
| | |
|---|---|
| *F21V 9/00* | (2018.01) |
| *G06F 3/0482* | (2013.01) |
| *G06F 3/0488* | (2022.01) |
| *H05B 45/20* | (2020.01) |
| *H05B 47/16* | (2020.01) |
| *H05B 47/175* | (2020.01) |
| *H05B 47/19* | (2020.01) |

(52) U.S. Cl.
CPC .............. *F21V 9/00* (2013.01); *G06F 3/0482* (2013.01); *G06F 3/0488* (2013.01); *H05B 45/20* (2020.01); *H05B 47/16* (2020.01); *H05B 47/19* (2020.01); *H05B 47/1965* (2024.01); *H05B 47/198* (2024.01)

(58) Field of Classification Search
CPC ........ F21V 9/00; G06F 3/0482; G06F 3/0488; H05B 45/20; H05B 47/16; H05B 47/19; H05B 47/1965; H05B 47/198
See application file for complete search history.

(56) References Cited

U.S. PATENT DOCUMENTS

| | | |
|---|---|---|
| 9,655,215 B1 | 5/2017 | Ho et al. |
| 9,795,000 B1 | 10/2017 | Sooch et al. |

(Continued)

FOREIGN PATENT DOCUMENTS

| | | |
|---|---|---|
| DE | 102010015518 A1 | 10/2011 |
| DE | 102014116531 A1 | 12/2016 |

(Continued)

*Primary Examiner* — Renan Luque
(74) *Attorney, Agent, or Firm* — Hayes Soloway PC

(57) ABSTRACT

A lighting system comprises one or more illuminants and a control device for adjusting light parameters of the illuminants during operation. The control device is arranged to adjust the light parameters time-dependently according to a predetermined course of the light parameters. The control device is further adapted to receive a one-dimensional user setting and to change the course of the light parameters according to the one-dimensional user setting.

20 Claims, 9 Drawing Sheets

(56) References Cited

U.S. PATENT DOCUMENTS

| | | |
|---|---|---|
| 9,900,957 B2 | 2/2018 | van de Ven et al. |
| 2008/0265685 A1 | 10/2008 | Blair et al. |
| 2011/0254445 A1 | 10/2011 | Bachhuber |
| 2014/0070707 A1 | 3/2014 | Nagazoe |
| 2014/0104321 A1 | 4/2014 | Steffy |
| 2016/0295658 A1 | 10/2016 | Chraibi et al. |
| 2017/0290116 A1 | 10/2017 | Bruwer |
| 2018/0014384 A1 | 1/2018 | Charlton |
| 2018/0077770 A1* | 3/2018 | Sooch .................. H05B 45/20 |
| 2019/0289703 A1 | 9/2019 | Lang et al. |

FOREIGN PATENT DOCUMENTS

| | | |
|---|---|---|
| WO | 2015040036 A1 | 3/2015 |
| WO | 2016058849 A1 | 4/2016 |
| WO | 2016199101 A2 | 12/2016 |

\* cited by examiner

LIGHTING SYSTEM FOR DYNAMIC LIGHTING CONTROL

CROSS-REFERENCE TO RELATED APPLICATIONS

This patent application is a Continuation of U.S. patent application Ser. No. 16/980,977, filed on Sep. 15, 2020, which is a national stage entry under 35 U.S.C. § 371 of PCT International Patent Application No. PCT/EP2019/056576, filed on Mar. 15, 2019, which claims priority to German Patent Application No. 10 2018 106 089.0, filed on Mar. 15, 2018. Each of these patent applications is incorporated by reference herein in its entirety.

TECHNICAL FIELD

The present disclosure concerns a lighting system for dynamic lighting control.

BACKGROUND

Lighting systems that enable dynamic lighting control are used in conjunction with Human Centric Lighting. In particular, the brightness and light color of lamps, luminaires, or lighting systems is time-controlled.

In general, a lighting dynamic oriented to the natural course of daylight is realized, which is characterized by bright light with a cool white (daylight-like) light color during the day and reduced brightness with a warm white light color in the evening and at night.

The time control is usually carried out on the basis of permanently programmed times and assigned values for the adjustment of brightness and light color. A calculation method is used to interpolate between these fixed values in order to achieve gradual transitions that are imperceptible to the user.

In some systems, the permanently programmed times can be adjusted manually or automatically depending on the season and geographical location, using astronomical calculations, or included tables (e.g., for sunrise and sunset).

For special requirements, it can be deviated by user intervention from the given dynamics by selecting special scenes (e.g., a scene with reduced brightness for watching video presentations in schools or meeting rooms). Another example is a "Christmas mood" with low brightness and very warm white lighting with the intention of creating a pleasant atmosphere. These special scenes are generally static. This eliminates the dynamics that make sense from a biological point of view.

The user intervention options described above by selecting predefined scenes are generally not sufficient and must be configured in each individual case, which involves considerable effort during commissioning or subsequent adaptation.

A free possibility of intervention by the user with the possibility to change the brightness and color temperature of the lighting system is generally not conducive for achieving the desired effect, as users do not have the necessary expertise to select from the multitude of setting options those which correspond to the respective situation or the individual needs of the user.

It can even happen that users, out of ignorance, set up lighting situations that are supposed to meet their wishes, but from a biological point of view have negative effects on the user. This can be, for example, a lighting situation in which very bright and cool white lighting is set at night. Often such possibilities are not used at all or are used incorrectly because the users are not familiar with the operating concept or are overstrained. In most cases, a deeper understanding of the technical function of the lighting system or an understanding of the visual and non-visual effects of light is required to make proper use of a dynamic lighting system, which is not available to the user.

Planners and installers are also often overstrained with the planning and commissioning work because complex programming tasks have to be performed on lighting control systems, while user requirements are often unclear in detail. In addition, the user often only wants to be able to change predefined settings once the system is in use.

SUMMARY

Based on the known state of the art, it is a task of the present disclosure to provide an improved lighting system.

The task is solved by a lighting system with the characteristics of the independent claims. Advantageous further aspects result from the dependent claims.

Accordingly, a lighting system is proposed, comprising one or more illuminants and a control device for adjusting light parameters of the illuminants during operation. Lighting parameters can be, in particular, the intensity and/or the color temperature of the light emitted by the illuminants during operation. The term intensity is used here and in the following as a collective term for photometric quantities such as, for example, brightness, illuminance, or also luminance. Even though, for reasons of simplicity, it is referred in the following to several illuminants, a lighting system according to the present disclosure may also have only one illuminant. Since a given intensity of the light emitted by the illuminants in a given installation leads to a clear distribution of the illuminance in a room, the terms intensity, brightness, and illuminance are used interchangeably in the following.

A light parameter can also be a variable beam characteristic of a light source (e.g., the beam direction or a variable beam angle). This will not be discussed in detail below but can be treated in analogy to illuminance or color temperature.

The illuminants can be connected to the control device via cable (e.g., DALI, DMX, or via other protocols) and/or wireless (e.g., WLAN, Bluetooth, ZigBee, Z-Wave, or via other protocols). A mixed connection (partly via cable, partly wireless) is also possible.

The control device is set up to adjust the light parameters time-dependently according to one or more predetermined courses of the light parameters. In particular, the intensity and/or the color temperature of the light may be subject to change in the course of a day. The courses of these changes can be described by functions which define the values of the light parameters (e.g., depending on the time of day). The control device may have a real-time clock by means of which the current time is available to the control device or an interface by means of which the current time is made available to the control device. These functions can be defined continuously or point-by-point for specific times only, while for other times, the light parameters are interpolated. In particular, for times where the changes are only minor (e.g., at night), a period of several hours may elapse between two defined times.

Furthermore, the time can be defined on a descriptive scale. For example, one time can be defined for sunrise, one for maximum sun elevation, one for sunset, and one for midnight. Intermediate times can be defined depending on these times. For example, the time between sunrise and sun maximum can be divided into several segments. The same applies to the time between sunrise and sunset, for the evening, the night, and until sunrise the next morning. For example, an entire day can be defined by several (e.g., 20) such descriptive times and light parameters assigned to the times.

The assignment of the descriptive times to real time (time of day) can be done according to an astronomical program which determines the real time for the above-descriptive times for each day at the respective location of the lighting system. Astronomical programs which determine the real time for sunrise and sunset are known. Although only one set of lighting parameters is defined, each day of the year can be assigned an individual course based on the real course of daylight.

The following table shows two examples of how descriptive times are assigned to real time (the London example takes the other time zone into account and both examples take daylight saving time into account).

| Descriptive time | Real time Example Munich, Jan. 10, 2017 | Real time Example London, Jan. 7, 2017 |
|---|---|---|
| Midnight | 0:00 | 0:00 |
| Sunrise − 2/10 LN | 4:45 | 3:17 |
| Sunrise − 1/10 LN | 5:59 | 4:02 |
| Sunrise − 30 minutes | 6:43 | 4:17 |
| Sunrise | 7:13 | 4:47 |
| Sunrise + 30 minutes | 7:43 | 5:17 |
| Sunrise + 1/10 LD | 8:23 | 6:26 |
| Sunrise + 2/10 LD | 9:33 | 8:05 |
| Maximum solar altitude − 1/10 LD | 11:53 | 11:24 |
| Maximum solar altitude | 13:03 | 13:04 |
| Maximum solar altitude + 1/10 LD | 14:13 | 14:43 |
| Maximum solar altitude + 2/10 LD | 15:23 | 16:22 |
| Sunset − 2/10 LD | 16:33 | 18:02 |
| Sunset − 1/10 LD | 17:43 | 19:41 |
| Sunset | 18:53 | 21:21 |
| Sunset + 1/10 LN | 20:07 | 22:21 |
| Sunset + 2/10 LN | 21:21 | 22:50 |
| Midnight − 1/10 LN | 22:46 | 23:15 |
| Midnight | 0:00 | 0:00 | where:
LD = Length of day = time between sunrise and sunset
LN = Length of night = time between sunset and sunrise the next day For example, the control device can control the illuminants in such a way that they emit light of low intensity and/or low color temperature (e.g., warm-white) in the morning and evening and light of high intensity and/or high color temperature (e.g., cold-white, similar to daylight) during the day. Likewise, for example, a light source can illuminate larger areas during the day via its orientation and/or beam angle, including, for example, walls, ceilings, or the facial area of people in the room, while in the evening, it can only illuminate specific objects, such as work surfaces.

The illuminants can be controlled individually or in groups, so that for different illuminants and different groups of illuminants, different courses can be specified.

The following description applies accordingly as an example for a single specified pattern for one lamp or group of lamps, besides which other patterns are also possible for other lamps. The control device can thus enable one or more sequences to be specified (e.g., to define different sequences for luminaires on ceilings than for luminaires illuminating walls).

The control device is further set up to receive a one-dimensional user setting and to change the course of the lighting parameters according to the one-dimensional user setting. A one-dimensional user setting is defined as a single quantity whose value lies between a lower limit value and an upper limit value. For example, the value of the one-dimensional user input can be between 0 and 1, alternatively between 0 and 100, further alternatively between 100 and +100. Preferably, a value in the value range of the one-dimensional user setting (e.g., a setting of 0) corresponds to the situation where the specified course of the light parameters remains unchanged. For all other settings, the value of the user setting determines how far the changed curve deviates from the specified curve. This means that the user does not need to change individual light parameters but determines the functionally derived changes of the light parameters by changing a setting variable. In particular, the one-dimensional user setting is not the setting of a light parameter such as brightness or color temperature.

Several different gradients for different lamps (also referred to as illuminants) can also be changed by the same user setting.

According to the present disclosure, the control device does not directly change the current values of the light parameters (i.e., not the current brightness and the current color temperature) upon input of a one-dimensional user setting but it changes the course of the light parameters from the specified course to a changed course in accordance with pre-set specifications and thus also affects their course in the future. This can also lead to the current values of the light parameters being adjusted accordingly if the changed progression for the current time outputs different values for the light parameters than the originally specified progression.

A change in the one-dimensional user input, therefore, does not lead to the start of a scene but takes into account in particular the current time of day (i.e., it continues the changed lighting parameters in accordance with the current time of day). Accidental starting of a scene that is inappropriate for the current time of day (e.g., a sunset at noon) can thus be prevented if the control unit is programmed accordingly.

For example, increasing the one-dimensional user setting can lead to an increase in both intensity and color temperature. The light, therefore, becomes brighter and "colder." Accordingly, a decrease in the one-dimensional user setting can lead to a decrease in both intensity and color temperature. The light, therefore, becomes darker and "warmer." By adjusting the light parameters in such a way that they depend on a single value, the operation of the lighting system can be simplified for a user. It can also prevent the user from selecting unsuitable combinations of values for the light parameters. In particular, if several light parameters are affected simultaneously by changing the one-dimensional user setting, the changes in the light parameters can be optimally matched.

This may cause that the same change in one-dimensional user input has a different effect on the lighting parameters depending on the time of day, in particular, the amount of change in the lighting parameters may vary. For example, a change in one-dimensional user input in the morning and/or evening may have a smaller effect on the change in brightness and/or color temperature than the same change in one-dimensional user input at noon or in the afternoon.

The change in the light parameters can result from a change in the one-dimensional user input, for example, by means of a corresponding specification (e.g., by means of an analytical or numerical function, which can also be defined section by section or by means of a pre-calculated value table, if necessary also by interpolation).

Preferably, the lighting system has an input means connected to the control device for entering the one-dimensional user setting. The input means can be a direct input means, such as a switch, push button, or rotary or slide control. The direct input means may be a mechanical input means. The direct input device may also have a display device on which one or more input elements corresponding to a mechanical input device are displayed. Such a display device is preferably touch-sensitive. However, a touch-sensitive display device may also display one or more input elements which have no equivalent in a mechanical input device. A mixed display is also possible. The input device can be connected to the control device via cable and/or wireless (e.g., WLAN, Bluetooth, ZigBee, Z-Wave, or by means of other protocols).

The input device can also be set up to show a measure of the change in the course of the light parameters on the display device. This can be done, for example, by a graphical representation of the value of the one-dimensional user setting. A graphical representation of the effect of the selected one-dimensional user setting on the light parameters can also be provided. It is also possible to display certain thresholds of the value of the one-dimensional user setting (for example, in the form of words).

The input device can also be an application running on a computer (in particular, desktop computer, laptop computer, smartphone, tablet, or other mobile devices). The application may display one or more input elements on a display device of the computer as described above.

In one version, the control device is also set up to change the specified course of the light parameters according to further input values. Further input values here are input values which are not entered by a user. The further input values can be determined by the control device itself (e.g., by means of internal sensors or by calculation from already known values). The control device can also accept the further input values from other components, in particular, from external sensors.

Examples of other input values are the date, the time, and the presence of people in the area illuminated by the lamps. For example, the intensity of the lighting can be reduced if no people are present.

The other input values are first calculated into a single quantity together with a manipulated variable entered by a user via an input device, which then serves as a one-dimensional user input for the lighting system. In a simple case, for example, the user input via a rotary encoder, which determines a certain setting with regard to light color and brightness, can remain unchanged when persons are present, while it is set to a defined value (e.g., "−2") in case of absence of persons. This value would then correspond to a "dynamic" progression that has a brightness equal to zero at all times. The resulting one-dimensional input variable can be used to switch off the lighting when nobody is present. This corresponds to the "dimming function" shown later.

Even when other input values are taken into account, the current values of the light parameters (i.e., not the current brightness and the current color temperature) are not changed directly but rather the course of the light parameters from the specified course to a changed course according to preset specifications. This can also lead to the current values of the light parameters being adjusted accordingly if the changed curve provides different values for the light parameters for the current point in time than the originally specified curve. For example, a light sensor can measure the brightness in the room, which is also influenced by natural daylight, and this variable can be calculated with the direct user input to a new one-dimensional input variable in such a way that a different dynamic curve is subsequently realized, which is lower in terms of brightness than that which would result without the influence of daylight only on the basis of the direct user setting.

In one version, the control device is also set up to change the specified course of the light parameters non-linearly with the one-dimensional user setting. For example, if the one-dimensional user setting is changed to higher setting values, the intensity can initially be changed relatively more than the color temperature, while changes to lower setting values cause the color temperature to change relatively more than the intensity.

In one version, the control device is further equipped to take into account maximum and/or minimum values for the light parameters when changing the course of the light parameters. In other words, there can be a predetermined course of maximum and/or minimum values for the light parameters and the control device can ensure that the changed course of the light parameters is not above the predetermined course of maximum values and/or not below the predetermined course of minimum values.

In particular, the maximum and/or minimum values may depend on time parameters and/or on parameters other than time. As an example of temporal parameters, the maximum value of intensity and/or color temperature in the morning and/or evening hours may be lower than during the day. This can prevent user settings that are contrary to the circadian rhythm, for example.

In one version, the control device is set up in such a way that the progressions are described by fixed value points for various predefined times and predefined user settings. Intermediate points in time or with regard to user settings can be interpolated between the defined value points.

In one version, the control device is also set up to reset the changed course of the light parameters to the predetermined course of the light parameters after a predetermined first period of time. This ensures that changes made by the user to the light parameter profile are automatically reversed after the first time period. The first time period can have a constant duration. The first period can also have different durations depending on the changes made. For example, small changes in the course of the light parameters can be maintained for a longer period of time than large changes.

The resetting of the changed course of the light parameters to the specified course of the light parameters after the expiration of the specified first time period can take place abruptly or continuously over a specified second time period.

In one version, the control device is further equipped to maintain the changed course of the light parameters even after switching the lamp(s) (illuminants) off and on again if there is at most a predetermined third time period between switching off and on again. Thus, if the area illuminated by the light sources is left for a short time, the light sources can be switched off without losing the change made when they are switched on again. On the other hand, the third time span can be selected in such a way that after switching off and switching on again after half an hour or the next day, the light parameter curve is reset to the predefined curve, so that the user does not have to worry about whether a changed light parameter curve has been set.

BRIEF DESCRIPTION OF THE FIGURES

Preferred further embodiments of the present disclosure are explained in more detail in the following description of the figures.

DETAILED DESCRIPTION

In the following, preferred embodiments are described using the figures. Identical, similar, or similar-acting elements in the different figures are marked with identical reference signs, and a repeated description of these elements is sometimes omitted in order to avoid redundancies.

Figure 1:
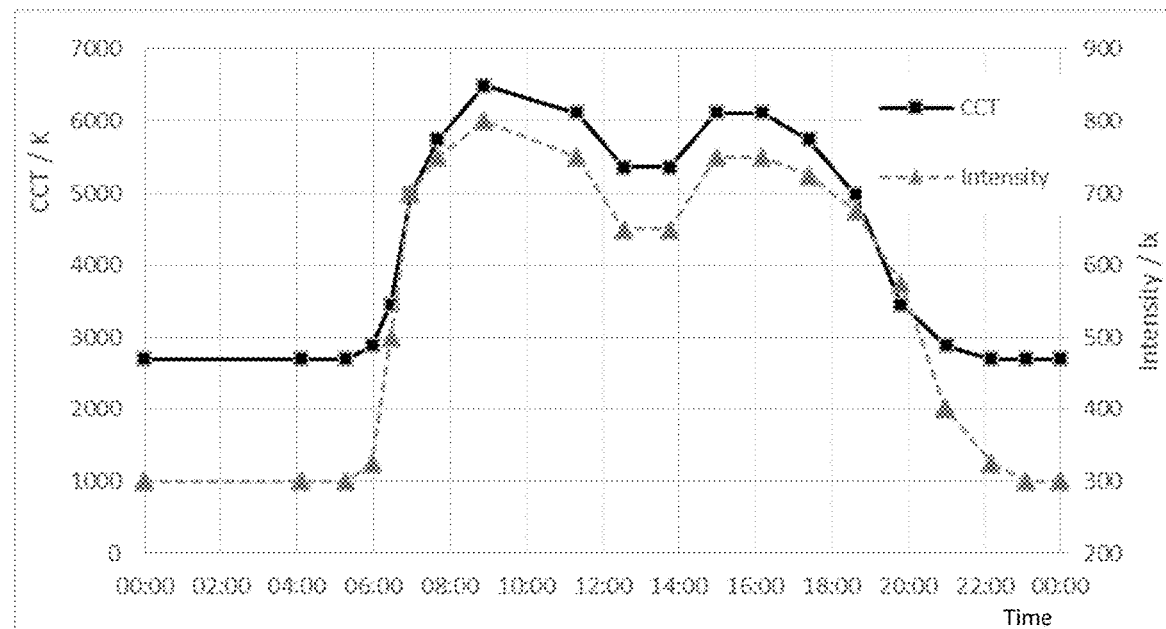
FIG. 1 illustrates a predefined gradient for intensity and color temperature.

FIG. 1 shows a predefined curve for intensity and correlated color temperature (CCT). A control device of an illumination system can automatically and dynamically (time-controlled) adjust the intensity and color temperature of the illuminants belonging to the illumination system on the basis of these predefined curves in such a way that an advantageous illumination in the sense of Human Centric Lighting is created.

Dynamics are defined by specifying certain interpolation points which, at defined times t corresponding to the time of day, provide associated values for illuminance (illuminance and light intensity are used interchangeably in the following) and color temperature. For times between the defined interpolation points, intermediate values can be automatically interpolated by the control device so that smooth transitions from one interpolation point to the next are possible which are not noticeable to the user.

Figure 2:
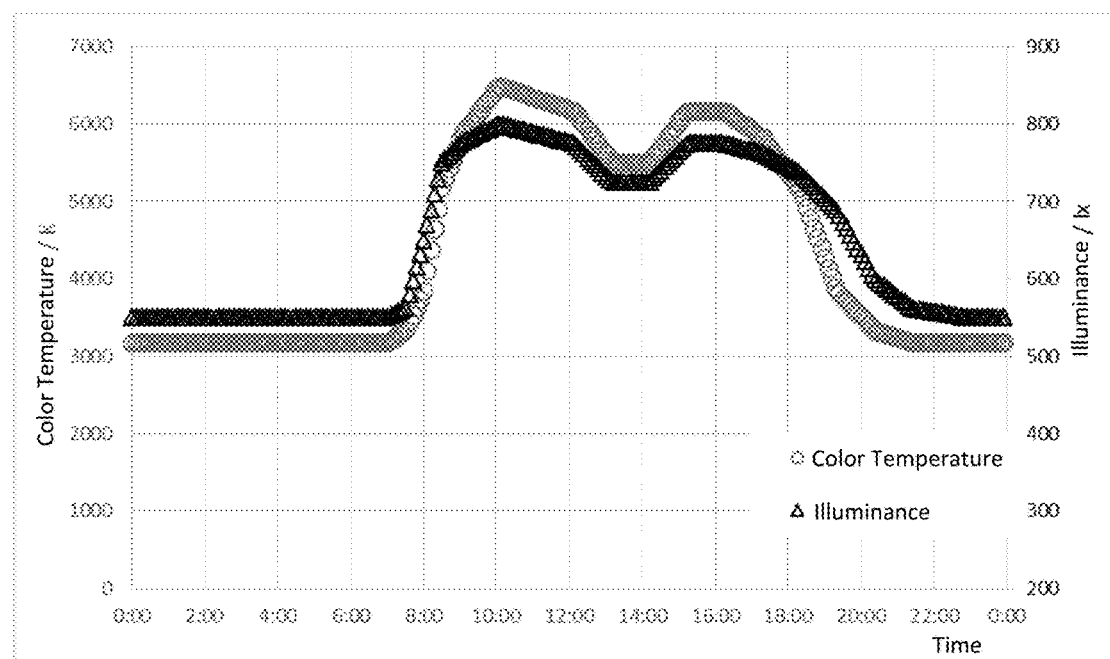
FIG. 2 illustrates a further predefined curve for intensity and color temperature.

Alternatively, it is possible to specify additional grid points for a finer gradation, as shown in FIG. 2. Then, interpolation can be omitted. The gradation should preferably be so fine that the threshold of perceptibility is not exceeded in case of color or brightness changes, so that the user is not disturbed.

FIGS. 1 and 2 and FIGS. 3 to 7 described below show the color temperature in Kelvin (K) on the left and illuminance in lux (lx) on the right (except for FIGS. 3a-3d). The curves can be stored in the control device directly as such physical quantities but also as other values from which physical quantities can be calculated.

The times for which grid points are defined can be changed in a form dependent on astronomical data (e.g., local time, times of sunrise and sunset, and geographical position). This can be done manually or automatically or program-controlled. Thus, for example, the time at which the increase in illuminance and color temperature begins in the morning can be automatically adjusted to the time of sunrise.

The given time course S of a light parameter X can be expressed as $S_{X,0}(t)$. For example, the given time course of intensity (or illuminance) can be expressed as $S_{B,0}(t)$ and the given time course of color temperature as $S_{T,0}(t)$. If astronomical data are taken into account, as described above, different functions result for different days of the year and different geographical locations.

The above describes dynamic lighting control without user intervention, which is now advanced state of the art. This time-dependent control of color temperature and brightness can be changed by further superimposed functions. Here, the interpolation points for illuminance and color temperature, which originally determined a fixed initial or basic setting for illuminance $S_{B,0}(t)$ and color temperature $S_{T,0}(t)$ for each time t, are changed for each time according to a superimposed function. These superimposed functions can be defined by external signals such as user interfaces or sensors. But they can also include parameters such as the time of day or the time of year. This allows the user to make individual interventions in the system and change the predefined settings.

This allows the user to change the setting for illuminance and color temperature according to these superimposed functions $f_T(t,x)$ for color temperature and $f_B(t,x)$ for illuminance.

Thus, the following equations result for the changed settings $S_B(t,x)$ and $S_T(t,x)$ for illuminance and color temperature at time t:

$$S_B(t,x) = S_{B,0}(t) \cdot f_B(t,x)$$

$$S_T(t,x) = S_{T,0}(t) \cdot f_T(t,x)$$

The parameter x stands for a value that can be calculated from various other parameters. Parameter x can be determined primarily or exclusively by a user-selected setting on a user interface, such as a desired adjustment to higher or lower values. However, parameter x can also be influenced by an external sensor which, in the absence of the user, reduces the basic setting to low values down to zero or which reduces the brightness depending on the availability of daylight.

In some instances, it is essential that adjusting the basic setting not only statically changes the instantaneous value but also changes the entire profile of light dynamics for each point in time t.

Figure 3A:
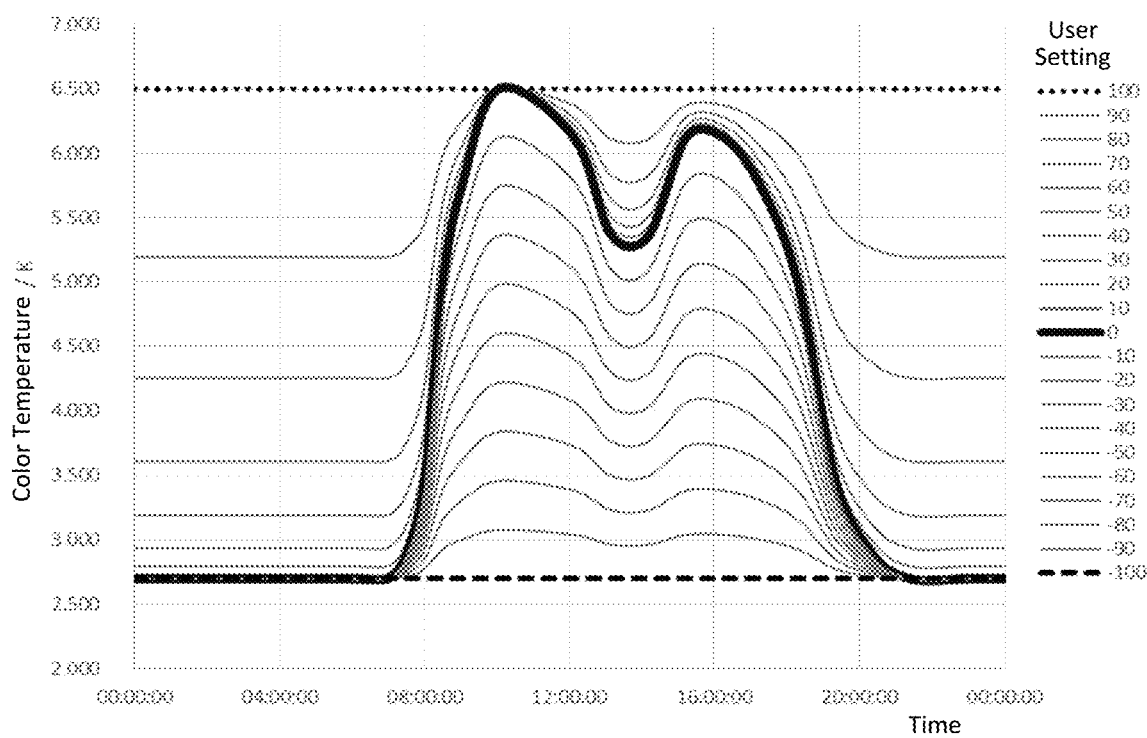
FIGS. 3a, 3b, and 3c illustrate further examples of predefined gradients and gradients of maximum and minimum values for color temperature and illuminance.

This is shown as an example for the color temperature in FIG. 3a. There, the basic setting is shown as a bold solid line, corresponding to a user input of 0. The maximum value, which in this case is limited by the technical possibilities of the lighting system, is shown as a dotted line at 6500 K. The minimum value is shown as a broken line at 2700 K.

For user inputs from −100 to +100, the resulting curves for the color temperature are shown as an array of curves.

The extent of the adjustment possibility (i.e., how far the setting of the lighting system may deviate from the basic setting $S_{X,0}(t)$ or which minimum and maximum values are permissible) can be restricted within certain limits.

Usually these limits are given by the technical possibilities of the lighting system (e.g., maximum intensity of a light source or technically possible range for color temperature). These technical limits can be further restricted in one embodiment by defining one or two limit functions each for the maximum and minimum setting values for illuminance and color temperature, which define maximum and/or minimum values for color temperature and for illuminance depending on the time of day t.

Also conceivable are alternative or additional limits that are set depending on other parameters such as the season or the characteristics of user groups.

Figure 3B:
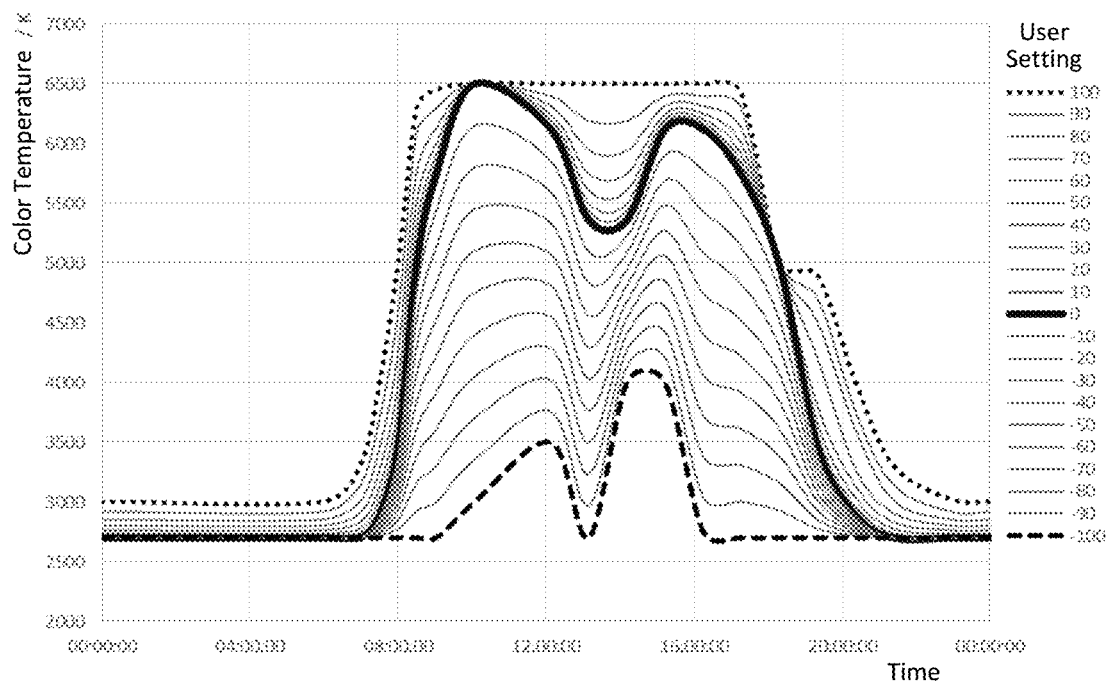

FIG. 3b correspondingly shows the basic setting (i.e., the given curve using the example of the color temperature as a bold continuous curve) corresponding to a user input of 0, depending on the time of day. The upper, dotted curve shows an example of a limit function for the maximum color temperature that can be set at a certain time. The maximum value of about 6500 K is due to technical reasons, but in the morning and evening hours, the maximum color temperature is further limited to lower values.

The lower, dashed curve shows the minimum color temperature that can be set. In the case shown here, the minimum value of about 2700 K is due to technical reasons, but during the day, the minimum color temperature is temporarily limited to higher values. FIG. 3b also shows examples of color temperature curves that can result from user inputs between −100 and +100.

Figure 3C:
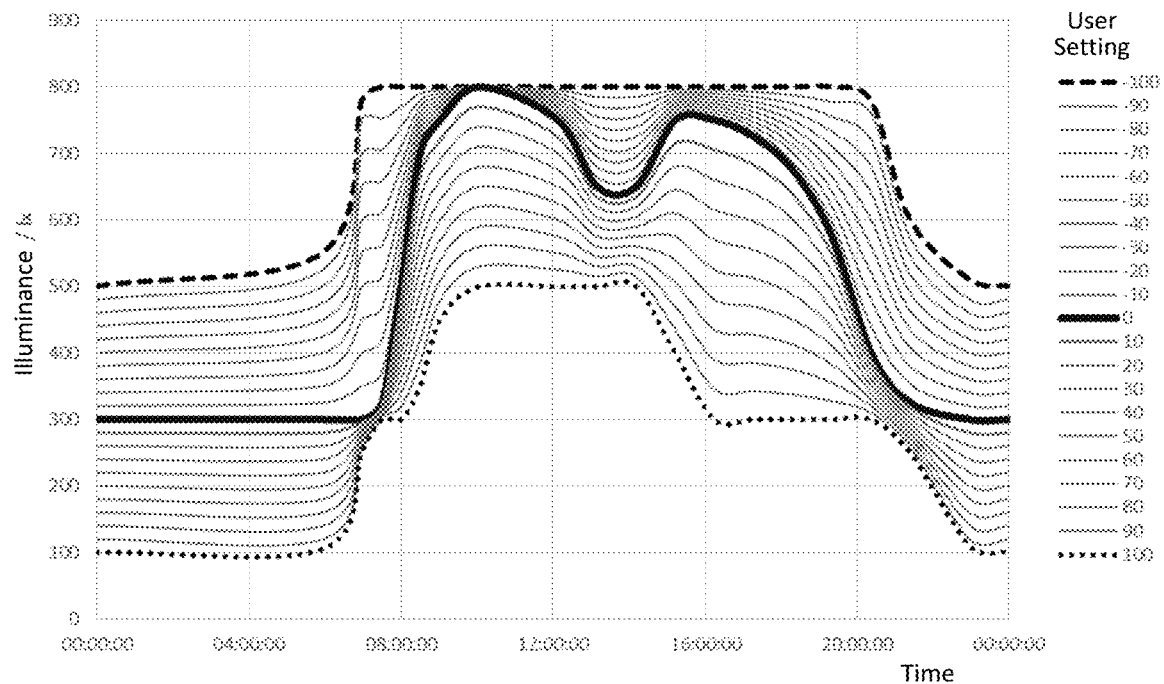

FIG. 3c shows a further example of a predefined curve (bold solid line) and upper (dashed line) and lower (dotted line) limits for illuminance. These can have a different characteristic than the color temperature curves. Nevertheless, they react to the same user input as the color temperature curve.

The exact course of these color temperature or intensity curves depends on the definition of the functions $f_T(t,x)$ and $f_B(t,x)$ and is only shown as an example in FIGS. 3a, 3b, and 3c.

Figure 3D:
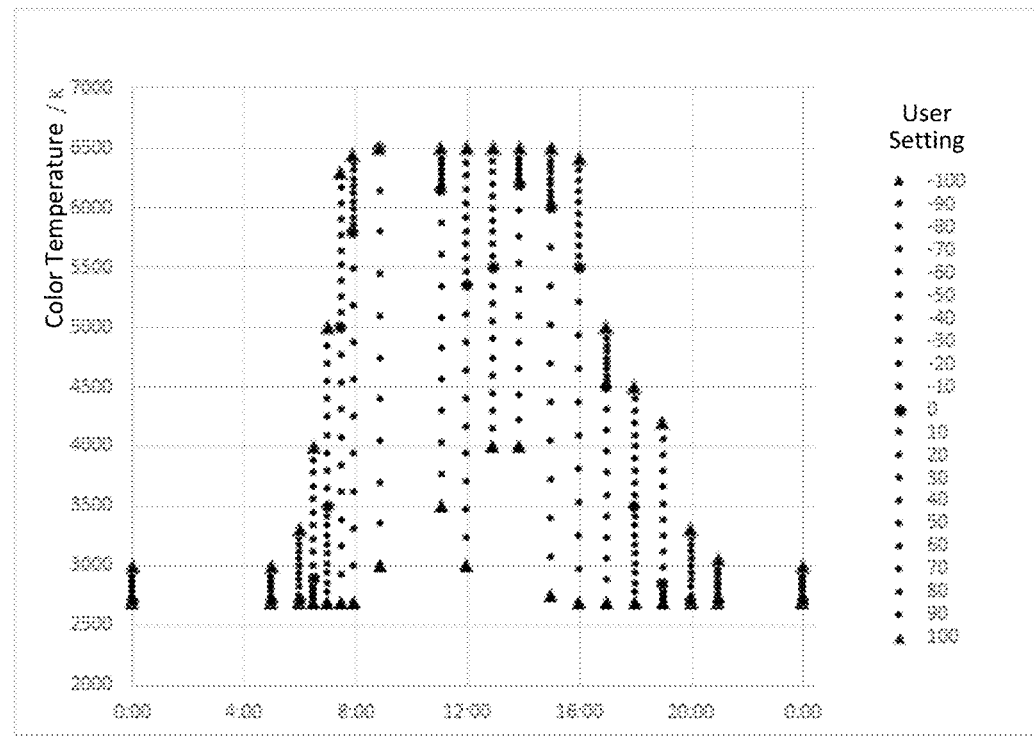
FIG. 3d illustrates an example of a point-by-point color temperature curve for 21 user settings and 20 points in time.

Whereas in FIGS. 3a, 3b, and 3c the course of the color temperature or intensity curves is shown as a continuous function, the curves for various given times and given user settings can be described by fixed value points. Values lying between the defined value points in terms of time or user settings can be interpolated between them. This is shown in FIG. 3d as an example. There, only several predefined values are allowed for both the time and the user settings, and a specific color temperature is predefined for each of these value pairs. Corresponding values can also be specified for the illuminance.

The limit functions can be used to limit the changeability of the light setting. For example, it makes sense not to allow very high values for the color temperature in the evening in order to minimize possible disturbances of the circadian rhythm of the users and a negative influence on sleep.

For example, a minimum illuminance $S_{B,min}(t)$ can be defined accordingly, so that $S_B(t,x) S_{B,min}(t)$ applies for all times or at least for certain times.

For example, a maximum color temperature of 6500 K can be permitted during the day in one embodiment if the system technically permits this. In the evening after 9:00 μm, the maximum value of the color temperature $S_{T,max}(t)$ for t>9:00 pm can be limited to 4000 K. If the basic setting (i.e., the specified course of the color temperature $S_{T,0}(t)$) provides for a color temperature of 2700 K for this time, a maximum color temperature of 4000 K can be achieved in this example also by user intervention. This makes it possible to restrict user intervention to settings that have been defined as useful.

For a biologically "sensible" setting during the day, a high color temperature and high illuminance is usually selected as the default setting; for evening and night, a low color temperature and lower illuminance are normally selected.

Such limit functions can be programmed as predefined "useful" functions in the lighting system and/or can be configured during commissioning or by experienced users.

For the restrictions for minimum and maximum values of color temperature and/or illuminance, other parameters can be taken into account in addition to the time of day. For example, a sensor for daylight or the presence of people can provide an additional signal that reduces the maximum intensity emitted by the illuminants.

In addition, further functions can be defined which exclude certain settings or combinations of settings. For example, combinations of very high color temperature with simultaneously low illuminance are not practical because they are perceived as unpleasant by the user. For example, the maximum color temperature $T_N$ can, therefore, be defined as a function of the set illuminance B. This can be done as follows:

$T_N <= 10 \cdot B$ with $T_N$ in K, $B$ in Lux for $B > 270$ lx and $T_N = 2700$ K for $B <= 270$ lx To enter a desired deviation from the specified course of the light parameters, an input device (also called user interface or control element) is preferably used. In one version, a control element allows a deviation from the initial setting $S_{B,0}(t)$ and $S_{T,0}(t)$ described above in one dimension (i.e., only in two directions) which are referred to as "up" and "down" in the following.

The control element can be a knob, a slider, a button with an "up" and a "down" function, or a comparable element that exists in real life or is virtually arranged on the user interface of a user interface. In some instances, an essential feature is that the input unit only outputs a one-dimensional quantity (e.g., number of units in the direction of "up" or "down") but this one-dimensional quantity affects the deviation from the basic setting for illuminance and color temperature on the basis of stored functions.

A setting E of the control element, therefore, corresponds to a change desired by the user in the predefined curves (control curves) for color temperature and illuminance. The setting of the control element does not have a direct effect on the color temperature and illuminance of the illuminants of the lighting system, but on the functions that describe color temperature and illuminance. The same changes to setting E can, therefore, have different effects on the actual change in color temperature and illuminance (e.g., depending on the time of day). Since further parameters can be included in the function for changing the basic setting, complex dependencies can be realized. It is conceivable, for example, that at certain times of the day, changes in color temperature are restricted in one direction or the other or that desired changes by the user have different effects on color temperature and illuminance depending on the current basic settings.

Pressing the "up" function (e.g., turning a knob clockwise) can cause a change in illuminance and/or color temperature towards higher values. If the "down" function is operated, the change can be made to lower values accordingly.

The degree of change V is defined for illuminance B and color temperature T in different functions $V_B=f_B(E,t,x)$ and $V_T=f_T(E,t,x)$, which are determined by the setting E of the control element, among other things.

The setting E can correspond to the position of a slide or rotary switch. It can also correspond to the number of pulses emitted or the rotational speed of a rotary encoder or to another value entered or calculated (e.g., via a gesture or sensor or otherwise) for the measure of an adjustment desired by the user or oriented to his requirements.

This also includes automatically generated values for E, which can, for example, come from a brightness or presence sensor or be calculated from user data or similar.

For example, the new settings for illuminance and color temperature are:

$$S_B(t)=S_{B,0}(t)+V_B \text{ and } S_T(t)=S_{T,0}(t)+V_T$$

For the example of illuminance in this example, the function according to the definition as described above would be:

$$f(t,x)=1+V_B/S_{B,0}(t) \text{ and}$$

$$S_B(t,x)=S_{B,0}(t)\cdot(1+V_B/S_{B,0}(t))$$

Other parameters that can be included in functions $V_B$ and $V_T$ may be the following:

- The time t, which can be determined by local time and season.
- The point in time at which a previous change was made. This makes it possible to limit the time for which a particular change is held. This can be used, for example, to ensure that the change a user makes is only effective for a certain time and then returns to the default setting.
- Any other parameters, which are symbolized by "x" in the formula above. In one embodiment, this can be the difference between the basic setting $S_{B,0}(t)$ or $S_{T,0}(t)$ and the respective maximum value or minimum value for illuminance and color temperature of the lighting system. In this way, it can be achieved, for example, that a desire to change towards lower values has a greater effect on the reduction of the color temperature if it is still set relatively high and that a reduction in illuminance is only realized when the setting value E is reduced further. Conversely, if the same reduction wish is determined by the setting value E, the illuminance can first be reduced at high illuminance and medium color temperature.

Experience has shown that users find the combination of low illuminance levels at high color temperature and high illuminance levels at low color temperature unpleasant. Furthermore, high illuminance levels at low color temperature are also not useful from an energy point of view, since the same effect on the biological system can usually be achieved with reduced illuminance and higher color temperature.

If the user makes changes, these basic principles can be largely respected in a lighting system that is in accordance with the present disclosure.

A desire to change to higher values ("up") could, therefore, initially have a greater effect on illuminance than on color temperature. Only when the user wishes to change very strongly in the direction of "up" is the color temperature also "adjusted."

Conversely, a desire for lower values ("down") could initially affect the color temperature if it is at a high basic level. The illuminance is "adjusted" accordingly.

In the following examples, values between −100 and +100 are used as numerical values for the setting E for the purpose of illustration. Values beyond this or any other scaling is also conceivable. The setting of the control element is transferred from the control element to the controller via an analog or digital signal.

The terms $S_T(t)$ and $S_B(t)$ for the settings of color temperature and illuminance are used here in such a way that the setting and the value itself are used synonymously, even if a digital value is calculated internally in the control device which only corresponds to the photometric values. Internally, this can be a percentage, an 8-bit or 16-bit control value, or similar.

The same applies to the color temperature, which can be converted internally in the control device or externally in the operating device of a lamp into a representation as color location x,y or as a ratio of pulse width modulation of two or more output channels of a lighting control system.

In the following examples, the default settings for a time $t_1$ are an illuminance $S_{B,0}(t_1)=650$ lx and a color temperature of $S_{T,0}(t_1)=5350$ K. The minimum values are $S_{B,min}(t_1)=300$ lx and $S_{T,min}(t_1)=2700$ K and the maximum values are $S_{B,max}(t_1)=800$ lx and $S_{T,max}(t_1)=6500$ K for illuminance and color temperature at time $t_1$.

A user intervention with a desired adjustment of E=+50 can be handled as follows:

Example (a)—"Linear" Response

In this example, illuminance and color temperature are changed in proportion to the setting E. Let us assume that a change of E by 1 corresponds to a change of the color temperature by 20 K:$V_T(t_1,1)=20$ K. A change of E by 50, therefore, corresponds to $V_T(t_1,50)=1000$ K. In this example, this applies to all times t, and the dependence of V and E is linear. Then, for the changed color temperature $$S_T(t_1)=\text{MIN}[S_{T,0}(t_1)+V_T(t_1,50);S_{T,max}(t_1)]=$$

$$=\text{MIN}[(5350 \text{ K}+1000 \text{ K});6500 \text{ K}]=6350 \text{ K}.$$

For the illuminance, it is specified that a change of E by 1 corresponds to a change of illuminance by 4 lx: $V_B(t_1,1)=4$ lx. A change of E by 50, therefore, corresponds to $V_B(t_1,50)=200$ lx. In this example, this also applies to all times t, and the dependence of V and E is linear. Then, for the changed illuminance $$S_B(t_1)=\text{MIN}[S_{B,0}(t_1)+V_B(t_1,50);S_B,\text{max}(t_1)]=$$

$$=\text{MIN}[(650 \text{ lx}+200 \text{ lx});800 \text{ lx}]=$$

$$=800 \text{ lx}.$$

In this simple example, maximum and minimum values are reached relatively quickly. The basic shape of the dynamic curve S(t) is changed by this. Maximum and minimum values are reached earlier and are retained for longer periods. More complex dependencies are not given here.

Figure 4:
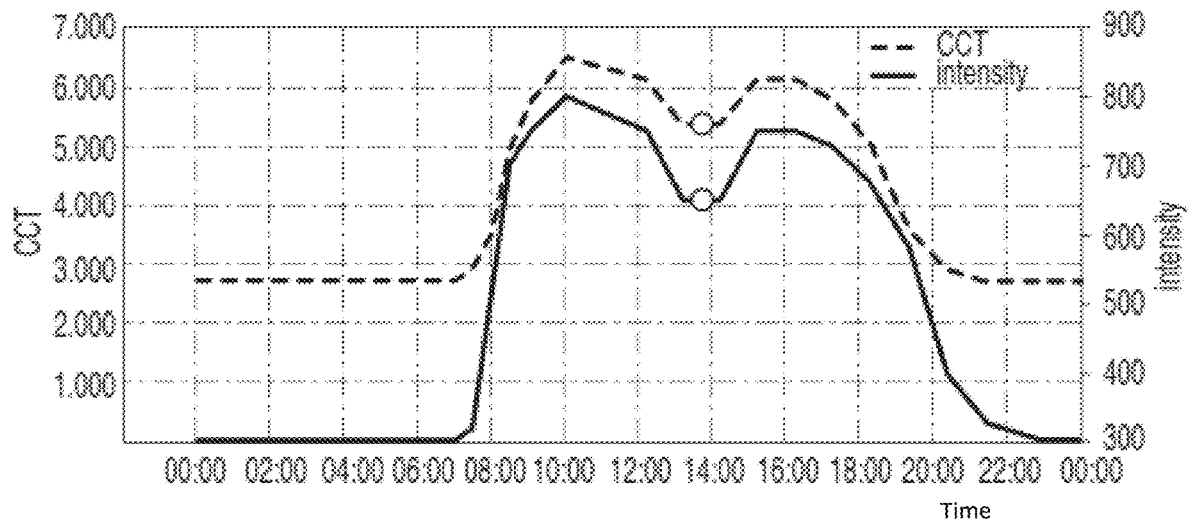
FIG. 4 illustrates a further predefined curve for intensity and color temperature.
Figure 5:
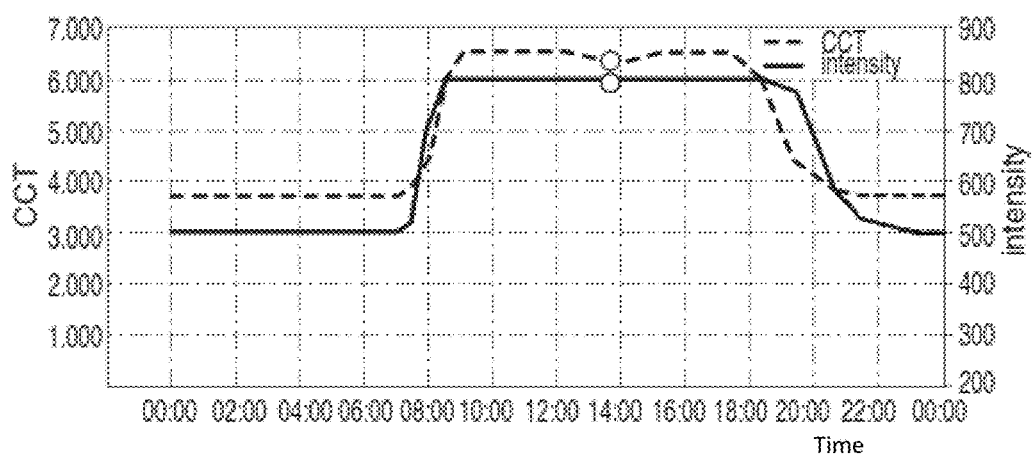
FIG. 5 illustrates a modified curve for intensity and color temperature.

For the above Example (a), FIG. 4 shows the specified course for color temperature and illuminance, and FIG. 5 shows the changed course of these light parameters for a +50 change by user input.

Example (b)—Linear Reaction with Finer Gradation

In this example, a change of E=1 corresponds to a change of 1% of the difference between the value for the basic setting $S_{T,0}(t_1)$ and the maximum value $S_{T,max}(t_1)$. Contrary to the example above, the maximum value is limited to 6000 K for the time $t_1$. Then, a change of E by 1 corresponds to a change of the color temperature $V_T(t_1,1)$ by 1% of the difference 6000 K–5350 K=650 K (i.e., by 6.5 K). Thus, $V_T(t_1,50)=325$ K and $S_T(t_1)=\text{MIN}[S_{T,0}(t_1)+V_T(t_1,50);S_{T,max}(t_1)]=$ $=\text{MIN}[(5350\text{ K}+325\text{ K});6000\text{ K}]=$ $=5675$ K.

With corresponding specifications for the change in illuminance, a change of E by 1 corresponds to a change in illuminance $V_B(t_1,1)$ by 1% of the difference 800 lx–650 lx=150 lx (i.e., by 1.5 lx). Thus, $V_B(t_1,50)=75$ lx and $S_B(t_1)=\text{MIN}[S_{B,0}(t_1)+V_B(t_1,50);S_B,\text{max}(t_1)]=$ $=\text{MIN}[(650\text{ lx}+75\text{ lx});800\text{ lx}]=$ $=725$ lx.

By relating the desired change to the difference between the value of the basic setting and the maximum value at time $t_1$, the setting is graded finer, and the basic waveform is maintained. The curve is rather stretched or compressed. Minimum and maximum values are reached at the same times as prior to the user intervention.

Figure 6:
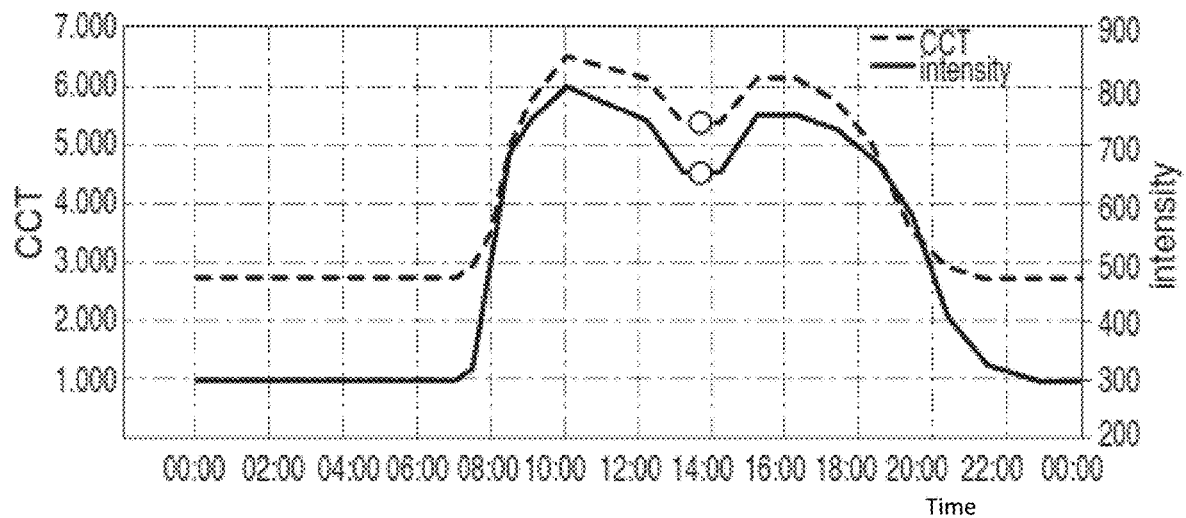
FIG. 6 illustrates a further predefined curve for intensity and color temperature.
Figure 7:
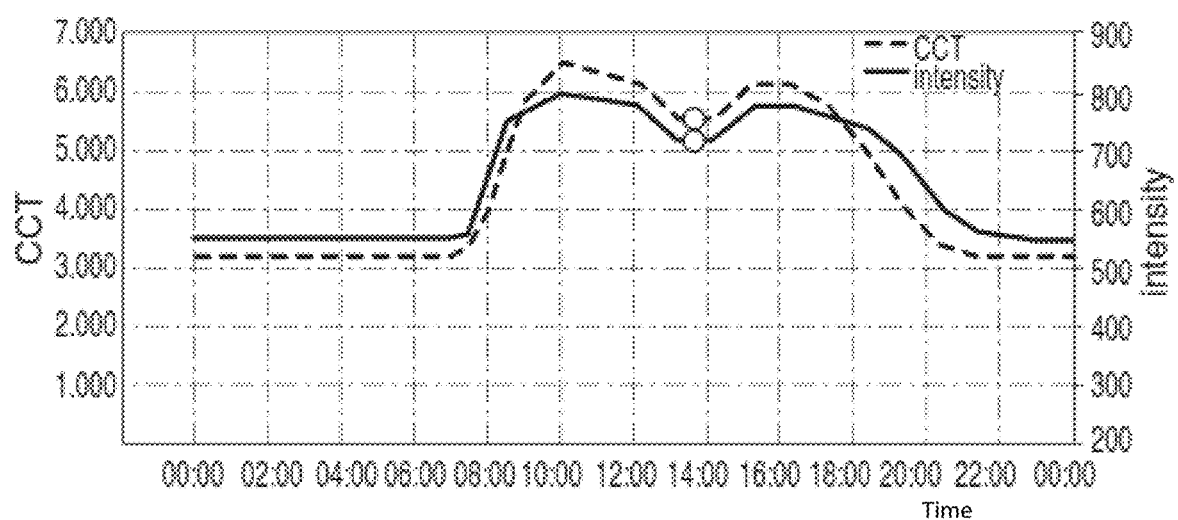
FIG. 7 illustrates a further modified curve for intensity and color temperature.

For the above Example (b), FIG. 6 shows the predefined curve for color temperature and illuminance, and FIG. 7 shows the changed curve of these light parameters for a +50 change in user input.

Any other functions are conceivable for assigning the setting E to changes V. Preferred are such changes where the relationship between setting E and change V for illuminance and color temperature is described by a monotonically increasing function (i.e., that with increasing values of E, illuminance and/or color temperature also increase or at least remain the same). Conversely, with decreasing values of E, illuminance and/or color temperature should also decrease or at least be maintained. Negative values of E mean a reduction of illuminance and/or color temperature according to Examples (a) and (b), but in the opposite direction.

Example (c)—Complex (Non-Linear) Response

In this example, which takes into account special features with respect to non-visual effects, the illuminance changes according to linear functions as described in Example (b), while the color temperature changes according to a non-linear function.

With the example settings used in Example (b), the following functions could be defined. For the illuminance, $V_B(t_1,50)=75$ lx and $S_B(t_1)=725$ lx apply identically to Example (b).

For the color temperature, a dependence on the 3rd power of the change E is defined:

$V_T(t_1,E)=(E/100)^3 \cdot (S_{T,max}(t_1)-S_{T,0}(t_1))$

For E=50, this results in $V_T(t_1,50)=0.5^3 \cdot (6000\text{ K}-5350\text{ K})=0.125 \cdot 650\text{ K}=81$ K and, therefore, $S_T(t_1)=5350\text{ K}+81\text{ K}=5431$ K.

Particularly in the evening, when the system is set to low color temperatures in its basic state, such a dependence makes it possible to change the color temperature relatively little at first, while the illuminance is changed significantly. Only when the setting value for the change pre-selected by the user approaches the possible maximum of 100% (E=100), the effect on a change in color temperature becomes stronger.

If the setting value is reduced compared to the basic setting, a correspondingly inverse behavior can be realized, so that the change initially has a stronger effect on the color temperature and only later on the illuminance.

Preferably, a minimum illuminance is defined, which is always maintained as a minimum value to ensure adequate visual quality. In working environments such as offices or conference rooms, this minimum value may be specified by standards. The value of $S_{B,min}(t)$ should correspond to this minimum value. In "normal" dynamics—even after user intervention—this minimum value is then not fallen below, as described above.

In some cases, however, it may be desirable to set a further reduced brightness (e.g., if a relaxed atmosphere is to be created in a room) or if only a very low brightness is desired (e.g., to watch a film or a presentation).

In this case, a further activation of the "down" function, when a maximum reduction in illuminance and color temperature up to the minimum values described above has already been achieved, can be seen as a user's wish to go below these "minimum values" up to switching off the lighting, corresponding to a dimming function. In this case, while the minimum color temperature is kept constant, the illuminance can be further reduced.

Since the settings themselves and the changes to the settings are not immediately apparent to the user, it can be useful to give the user feedback on what the changed settings will do and what changes he or she can expect for the current and future lighting settings.

Such a change can be visualized for the user, for example, graphically by a diagram showing the changed course of illuminance and color temperature, if necessary in comparison to the specified course.

Such diagrams are usually very complex and not necessarily easy to understand. For this reason, the following section describes examples of how a visualization displays the process in a simple manner.

Such a visualization can preferably be done directly at the input device, so that the user has an immediate view of the effects when changing the one-dimensional user settings. In particular, the input device may have a touch-sensitive display device on which the user makes the desired change by touch.

Figure 8A:
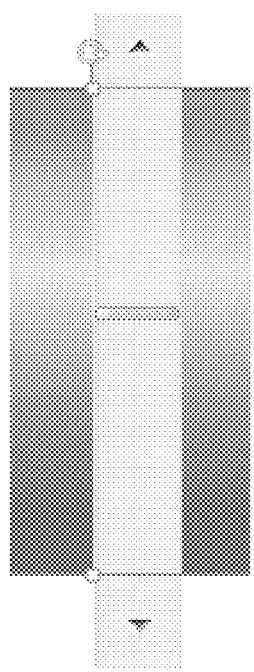
FIGS. 8a-8e illustrate various versions of the graphical representation of the value of the one-dimensional user setting.

In one version, the visualization is done by a bar chart (horizontal or vertical) on which the currently selected setting for the one-dimensional user setting is highlighted. Such a bar chart can, for example, display the value for the one-dimensional user setting in a color-coded manner, as shown schematically in FIG. 8a. A "neutral" color such as white or light yellow can be used for the "normal setting" (i.e., for a dynamic according to the given progression). Increased values for the one-dimensional user setting can be indicated by blue tones (e.g., light blue to dark blue or pale blue to strong blue) and decreased values can be indicated by red and/or orange tones (e.g., yellow to red). Such a display can be (quasi) analog (i.e., infinitely variable).

Alternatively, or additionally, the display can also show categories that represent, for example, the corresponding lighting situation. These categories can be indicated in words, as shown schematically in FIG. 8b. In the embodiment shown in FIG. 8b, these are, for example, "HCL Daylight" for the specified course (i.e., without any deviation entered by the user) and "Work Late" and "Performance Boost" for increased values of the one-dimensional user setting. For lowered values, "CREATIVE" and "RELAX" are used in this version. Of course, other and also more or fewer terms can be used.

Figure 8B:
Figure 8C:

In the embodiment shown in FIG. 8c, the categories are represented by symbols. Here too, other and also more or fewer symbols can be used. Symbols and words can also be used in a mixed manner.

Figure 8D:
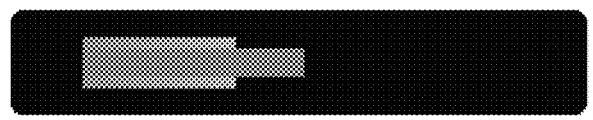

Another type of representation is shown schematically in FIG. 8d. Here, the current values of illuminance and color temperature are shown on a scale as superimposed bar graphs with different colors (e.g., yellow for illuminance (narrow bar), blue for color temperature (wide bar)). The bars can also be arranged below each other or next to each other. The bars can also be ring-shaped.

A new value can be calculated from the values for illuminance and color temperature using a formula. This can be done, for example, by multiplying the two values or by multiplying the two values with respective constant factors and adding the products.

If the spectral distribution is known, a factor can be determined from the color temperature that describes the ratio of melanopically daylight-equivalent illuminance according to DIN SPEC 5031-100:2015 to the visually assessed illuminance.

For a white LED illumination with 6500 K, this factor is about 0.8. For a warm white LED illumination with 3000 K, this factor is about 0.45.

If the illuminance is multiplied by the conversion factor calculated according to this method, the result is the melanopic daylight-equivalent illuminance according to DIN SPEC 5031-100.

This assessment procedure is now also defined in the international standard CIE S 026. The quantity defined in DIN SPEC 5031-100 as "daylight equivalent illuminance" is referred to in CIE S 026 as "melanopic equivalent daylight (D65) illuminance." Both quantities are identical in terms of their calculation method and numerical values for identical spectral distributions.

Figure 8E:
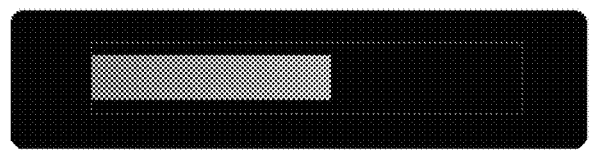

According to current knowledge, this variable is a measure of the effectiveness of light on the biological system at a given illuminance and color temperature compared to daylight. This variable can also be displayed on a scale for visualization purposes. This version is shown schematically in FIG. 8e. Here, too, in addition to a linear representation, it is also conceivable to display it as a ring-shaped bar or in the form of a speedometer display.

Figure 9:
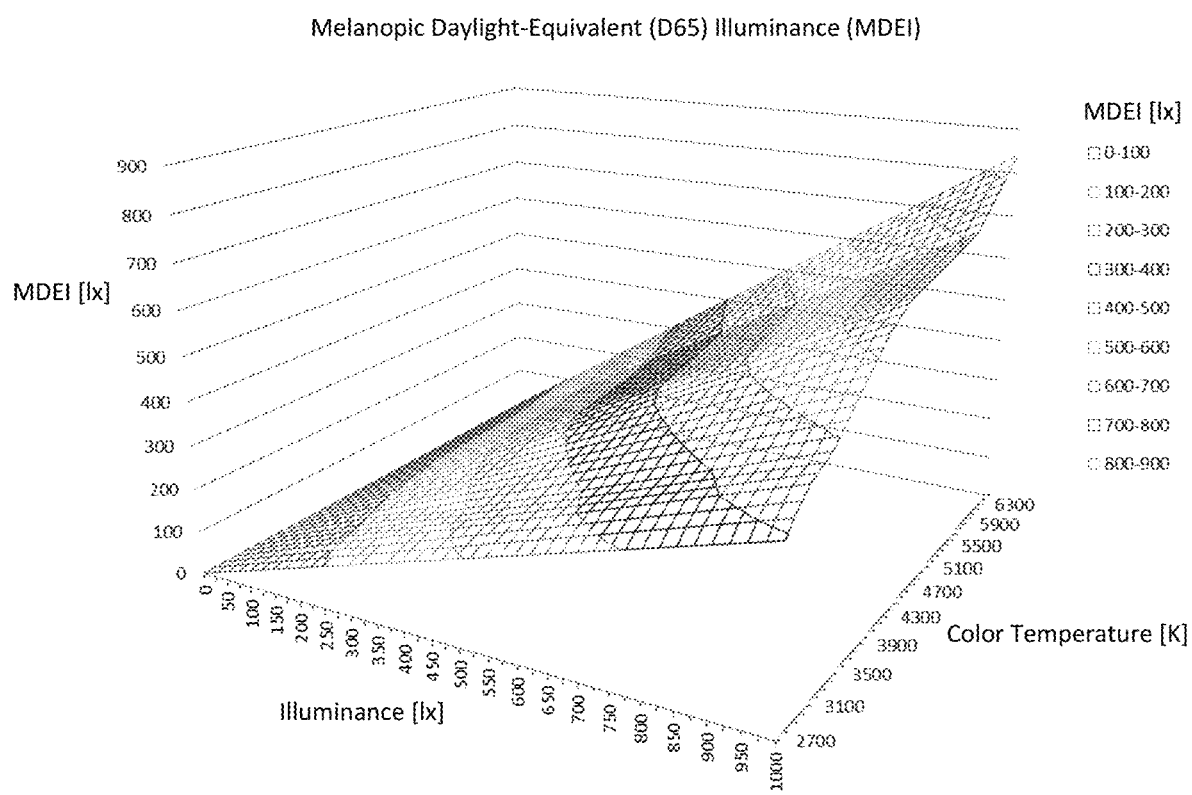
FIG. 9 illustrates an example of the dependence of melanopic daylight-equivalent illuminance on illuminance and color temperature.

The dependence of the melanopically daylight-equivalent illuminance on illuminance and color temperature is shown approximately for the example of LED lighting in FIG. 9.

FIGS. 10a to 10e show another type of visualization. Here, symbols for different values for the one-dimensional user input are shown on the left, comparable to FIG. 8c. The currently selected setting, or at least the symbol closest to the currently selected setting, can be highlighted. To the right of it, the respective progression of color temperature and illuminance is then displayed on a horizontal time axis. The color of the vertical bars can represent the color temperature at any given time; for example, warm white to neutral white light colors can be indicated by orange to yellow bars, and cool white light colors can be indicated by light blue to bright blue bars.

The illuminance can be symbolized by the length of the bars.

At the same time, the lower value of the bar can be determined by the color temperature. This allows to symbolize that higher color temperatures have a higher non-visual effect.

In the examples shown, one bar corresponds to the average value of about 1.5 hours over the entire day. In this way, the setting can be symbolized to the user. The current status can be displayed by a symbol (e.g., a sun symbol above the bars). The user has the possibility to see how the lighting situation will change further.

A visualization of the course of color temperature and illuminance, especially for future values, can also be done in other ways.

The symbols shown in FIGS. 10a to 10e on the left may correspond to the terms "Performance Boost," "Work Late," "HCL Daylight," "CREATIVE," and "RELAX" mentioned in relation to FIG. 8b.

The "Performance Boost" setting could also be referred to as "Boost," "Performance Enhancing Lighting," "Concentration," or with terms of similar meaning. This setting would be suitable for increasing concentration and performance in the short term, but it carries the risk of also having a negative effect on the user at the wrong time (e.g., through increased biological effects in the evening).

The possibility to choose such a setting can be limited by defining maximum values as described in detail above. You can also define a time limit for the "Performance Boost" setting (e.g., not after 10:00 pm).

The time for which the "Performance Boost" setting remains active can also be limited. For example, if you select the "Performance Boost" setting after 9:00 p.m., the setting value E could automatically decrease by a certain amount every 2-3 minutes under program control until the "Work Late" setting (described below) is reached again.

Figure 10A:
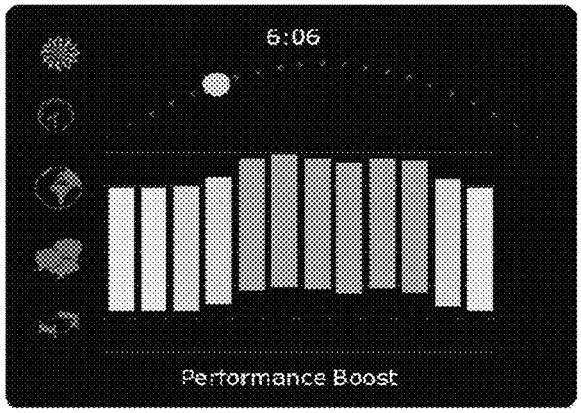
FIGS. 10a-10e illustrate an embodiment of the graphical representation of the given progression and various modified progressions for intensity and color temperature.

An example of how the light parameters in the "Performance Boost" setting are changed is shown in FIG. 10a. In FIGS. 3b and 3c, these are the curves which are close to the upper limits.

The "Work Late" setting could also be described as "evening work" or "concentration (without circadian disturbance)," "focused work," or similar. This setting, in which the illuminance is significantly increased beyond the specified initial setting while the color temperature is not or only slightly increased, is suitable for working in the evening or at night without having a significant disturbing effect on the circadian system. However, it can also be used during the day to promote concentrated work.

Figure 10B:
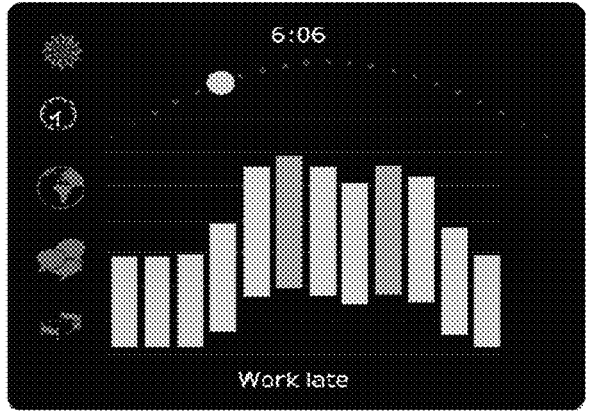

An example of a modified course of the light parameters in the "Work Late" setting is shown in FIG. 10b. In FIGS. 3b and 3c, these are the curves that lie in the middle range between the given curve and the upper limit curve.

The "HCL Daylight" setting could also be referred to as "HCL Mode," "Daylight," "Standard Mode," "Daylight Dynamics," "Natural Lighting," or similar terms that symbolize that the lighting is essentially based on the natural course of daylight.

Figure 10C:
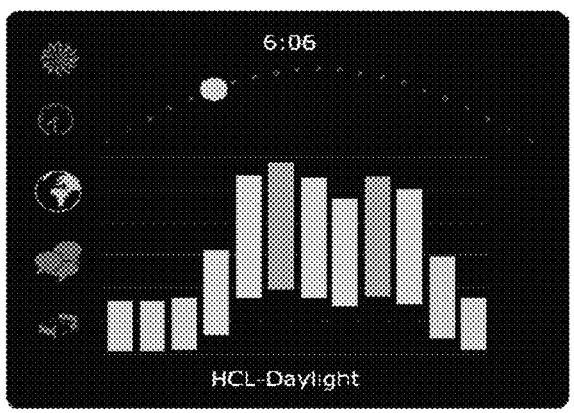

An example of a predefined curve of light parameters in the HCL Daylight setting is shown in FIG. 10c. In FIGS. 3b and 3c, these are the curves which are close to the given curve.

The "CREATIVE" setting could also be referred to as "creativity lighting" or similar. Studies have shown that creativity is higher with warm white lighting than with standard lighting or increased color temperature. In certain cases, it may be useful to deviate from this specification during the day when "standard HCL lighting" is used to provide bright, daylight-like lighting and to select the "Creativity setting" (e.g., for holding creativity workshops, brainstorming, or other activities where an inspiring atmosphere that promotes creativity is more important than concentration and attention).

Figure 10D:
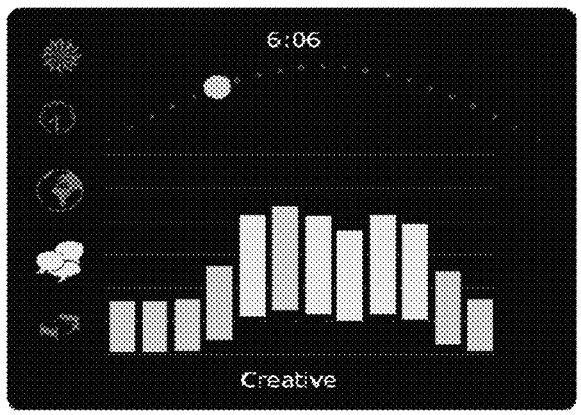

An example of a predefined course of the light parameters in the "CREATIVE" setting is shown in FIG. 10d. In FIGS. 3b and 3c, these are the curves which lie in the middle range between the given curve and the lower limit curve.

The "RELAX" setting could also be described as "relaxation" or similar. Warm colors and a brightness reduced below the usual "working level" promote relaxation and allow a familiar atmosphere. Applications include relaxed conversations in the afternoon or evening, but also "Christmas spirit" or similar.

Figure 10E:
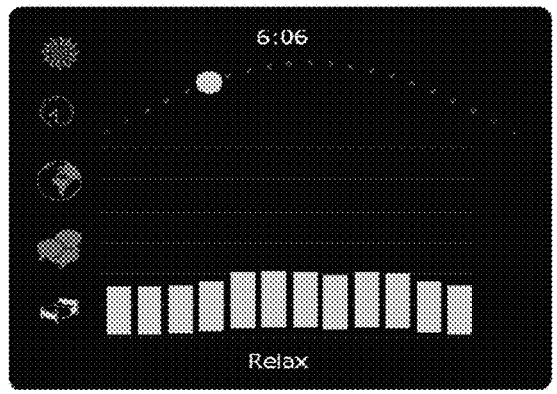

An example of how the light parameters change in the "RELAX" setting is shown in FIG. 10e. In FIGS. 3b and 3c, these are the curves which are close to the lower limit curve.

Even though five discrete settings have been described above, it may be provided that the one-dimensional user input can also take values between these discrete settings. The resulting course of the light parameters can then be displayed in the bar chart in the examples shown in FIGS. 10a to 10e. The large number of possible user inputs on the one-dimensional scale can also be grouped into more than the five groups mentioned or into other designations.

For example, 11 or 7 subdivisions can be defined for each of the above 5 settings, resulting in a total of 55 or 35 discrete settings. Any other number of subdivisions is also conceivable.

It is advantageous to select so many settings that no jumps in intensity or color temperature, which the user might find disturbing, occur when the user changes from one setting to another.

At the same time, it is advantageous that not so many settings are defined that the user does not notice any change, even though the user input has been changed significantly. The above-mentioned numbers between 35 and 55 setting options have proven to be advantageous for this.

In one example, the course of the light parameters over a 24-hour day is defined by 20 points in time; furthermore, the possible user settings are defined by 35 discrete settings for each of the 20 points in time. This results in a matrix of 20×35 points for each light parameter. This matrix can be calculated and permanently stored in a memory of the control unit as a table. During operation, the 20 points of time can be assigned to the real local time once a day, and in the course of time, the interpolation between the two points of time closest to the current local time can be performed for the respective user setting. With less powerful microcontrollers in the control unit, this can significantly reduce the time required for calculations of the lighting parameters. FIG. 3d shows an example for 21 user settings and 20 points in time.

In another version, the visualization of the one-dimensional user input can be done in words, where the size of the words symbolizes the set value. This is shown as an example in FIGS. 11a to 11c.

The category corresponding to the selected setting can be displayed in a larger font size than neighboring settings and more distant settings.

Figure 11A:
FIGS. 11a, 11b, and 11c illustrate a further embodiment of the graphical representation of the value of the one-dimensional user setting.
Figure 11B:
Figure 11C:

The font sizes can be finely adjusted in many steps, quasi-analogous to the settings chosen by the user. FIGS. 11a to 11c show examples of three visualizations from a possible large number of images for feedback of the setting to the user. Here, the visualization according to FIG. 11a corresponds to a "Boost" setting. The display shown in FIG. 11b corresponds to a setting between "Daylight" and "Work Late." The display shown in FIG. 11c corresponds to the "Creative" setting with a slight tendency towards "Relax."

Figure 12A:
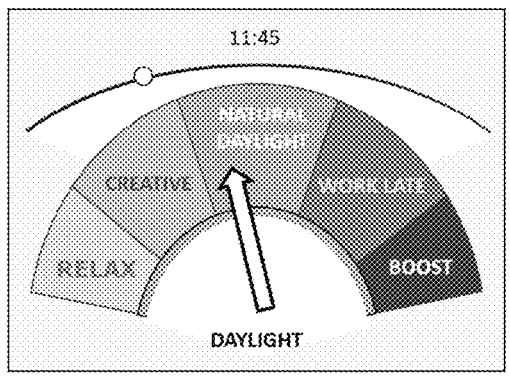
FIGS. 12a and 12b illustrate other embodiments of graphical representation of the value of the one-dimensional user setting combined with a quasi-analogue representation of the user setting as an arrow.
Figure 12B:
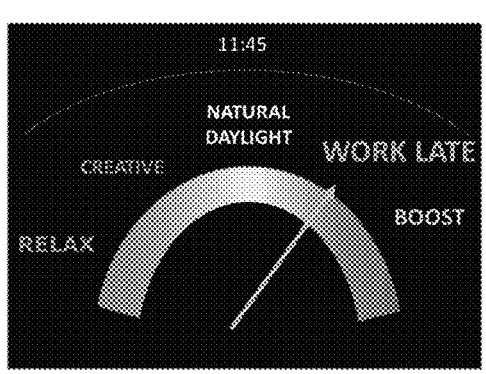

Another type of representation is shown schematically in FIGS. 12a and 12b. Here, the current value of the one-dimensional user input is shown on a curved scale by means of an arrow. Similar to the above, the characterization of the set value can be indicated by colors and/or font sizes in addition to the displayed terms.

Figure 13:
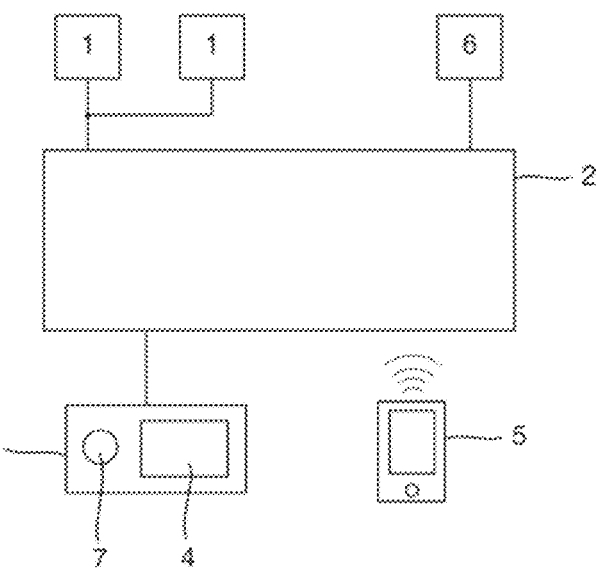
FIG. 13 illustrates schematically an embodiment of a lighting system according to the disclosure.

FIG. 13 shows schematically an embodiment of a lighting system according to the present disclosure. The lighting system has one or more illuminant(s) 1 (e.g., two illuminant(s) 1 are shown here) and a control device 2 for adjusting light parameters of illuminant 1 during operation. The illuminants 1 are connected to the control device 2 via cables. A wireless connection can also be provided.

The lighting system also has an input device 3, in which a display device 4 and a rotary control 7 are integrated. A one-dimensional user setting can be selected via the rotary control 7 of the input means 3 and transmitted to the control device 2. The input device 3 is connected to the control device 2 by cable. A wireless connection can also be provided.

A setting of the one-dimensional user default can, in some versions, also or exclusively be made via a program running on a mobile device 5 (e.g., smartphone or tablet). The mobile device 5 can communicate with the control device via wireless radio protocols.

The lighting system also has one or more sensors 6 that detect, for example, the brightness or presence of people and transmit this information to the control device. The sensors 6 are connected to the control device 2 by cables. A wireless connection may also be provided.

Although the present disclosure has been illustrated and described in detail by the design examples shown, the present disclosure is not limited to this, and other variations can be derived by the skilled person without leaving the scope of protection of the present disclosure.

In general, "one," etc., can be understood to mean a singular or plural, in particular in the sense of "at least one" or "one or more," etc., as long as this is not explicitly excluded (e.g., by the expression "exactly one," etc.).

Also, a numerical indication can include exactly the number given as well as a usual tolerance range, as long as this is not explicitly excluded.

As far as applicable, all individual features shown in the examples of design may be combined and/or exchanged without leaving the field of the present disclosure.

What is claimed is:
1. A lighting system comprising:
at least one illuminant configured to emit light characterized by light parameters; and
a control device configured for use in entering a desired deviation from a predefined course of the light parameters, wherein:
the control device is configured to output a one-dimensional quantity which affects deviation from an initial setting of the light parameters on the basis of at least one stored function that describes the light parameters; and
setting of the control device does not have a direct effect on the light parameters but does have a direct effect on the at least one stored function that describes the light parameters;
wherein a degree of deviation from the initial setting is defined by a function which depends on a difference between the initial setting and at least one of:

a maximum value of at least one of the light parameters; and
a minimum value of at least one of the light parameters.

2. The lighting system of claim 1, wherein the one-dimensional quantity represents a number of units of change toward either a higher value or a lower value of at least one of the light parameters.

3. The lighting system of claim 1, wherein the light parameters comprise at least one of intensity, color temperature, beam direction, and beam angle.

4. The lighting system of claim 1, wherein the initial setting is defined by a function which depends on at least one of a time of day and a time of season.

5. The lighting system of claim 1, wherein the function which defines the degree of deviation from the initial setting further depends on the setting of the control device.

6. The lighting system of claim 5, wherein the setting of the control device corresponds to a change in a pre-defined control curve for the light parameters.

7. The lighting system of claim 5, wherein identical changes to the setting of the control device have different effects on the light parameters at different times of day.

8. The lighting system of claim 5, wherein the setting of the control device corresponds to at least one of:
a value entered or calculated based on a gesture; and
a value entered or calculated based on an output of a sensor communicatively coupled with the lighting system.

9. The lighting system of claim 5, wherein the setting of the control device is generated automatically based on at least one of:
a sensor communicatively coupled with the lighting system; and
a calculation from user data.

10. The lighting system of claim 1, wherein the function which defines the degree of deviation from the initial setting further depends on at least one of a time of day and a time of season.

11. The lighting system of claim 1, wherein the function which defines the degree of deviation from the initial setting further depends on at least one further variable.

12. The lighting system of claim 1, wherein the control device is configured to output only the one-dimensional quantity.

13. The lighting system of claim 1, wherein the control device comprises at least one of:
a physical control element manipulatable by a user; and
a virtual control element presented on a user interface and manipulatable by the user.

14. The lighting system of claim 1, wherein the control device is a mobile device comprising at least one of a smartphone and a tablet computer.

15. The lighting system of claim 1, further comprising at least one of:
a mobile device configured to communicate with some other portion of the lighting system; and
a sensor configured to communicate with some other portion of the lighting system.

16. A lighting system comprising:
at least one illuminant configured to emit light characterized by light parameters; and
a control device configured for use in entering a desired deviation from a predefined course of the light parameters, wherein:
the control device is configured to output a one-dimensional quantity which affects deviation from an initial setting of the light parameters on the basis of at least one stored function that describes the light parameters;
setting of the control device does not have a direct effect on the light parameters but does have a direct effect on the at least one stored function that describes the light parameters; and
a degree of deviation in the light parameters is defined by a difference between the initial setting of the light parameters and at least one of a maximum value and a minimum value of at least one of the light parameters.

17. The lighting system of claim 16, wherein the degree of deviation in the light parameters is further defined by at least one of:
the setting of the control device; and
at least one of a time of day and a time of season.

18. The lighting system of claim 16, wherein the degree of deviation in the light parameters is further defined by each of:
the setting of the control device; and
at least one of a time of day and a time of season.

19. The lighting system of claim 16, wherein the control device is a mobile device comprising at least one of a smartphone and a tablet computer.

20. The lighting system of claim 16, further comprising at least one of:
a mobile device configured to communicate with some other portion of the lighting system; and
a sensor configured to communicate with some other portion of the lighting system.

* * * * *